Figure 1:
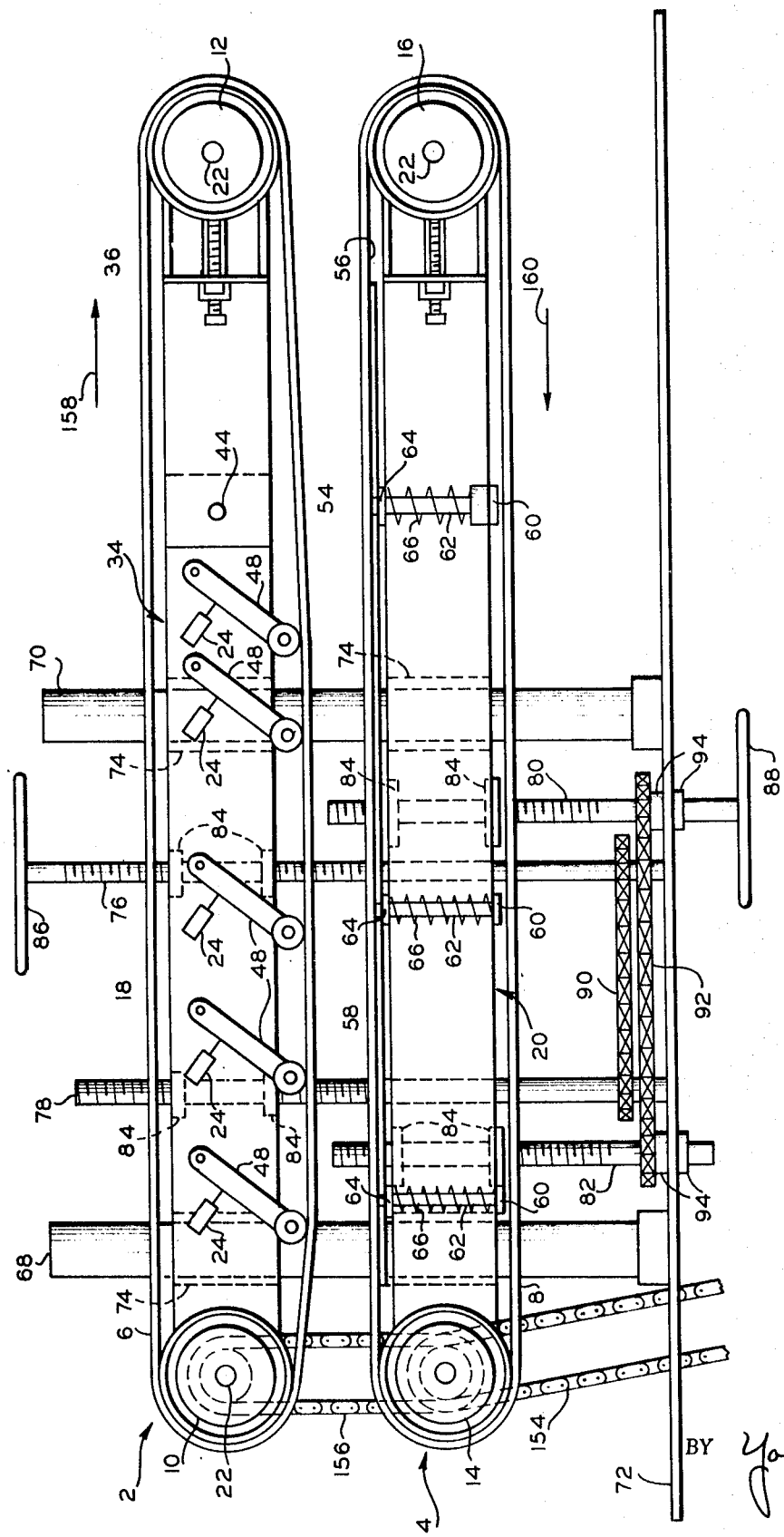

United States Patent

[11] 3,610,500

| [72] | Inventor | Claude V. Brown |
| --- | --- | --- |
| | | Bartlesville, Okla. |
| [21] | Appl. No. | 3,935 |
| [22] | Filed | Jan. 19, 1970 |
| [45] | Patented | Oct. 5, 1971 |
| [73] | Assignee | Phillips Petroleum Company |

[54] CONVEYING APPARATUS
4 Claims, 3 Drawing Figs.

| [52] | U.S. Cl. | 226/172 |
| --- | --- | --- |
| [51] | Int. Cl. | B65h 29/12 |
| [50] | Field of Search | 226/172, 171, 176, 177 |

[56] References Cited
UNITED STATES PATENTS

| 3,024,956 | 3/1962 | Gretler | 226/172 X |
| --- | --- | --- | --- |
| 3,285,485 | 11/1966 | Slator | 226/172 |

FOREIGN PATENTS

| 845,642 | 8/1960 | Great Britain | |

Primary Examiner—Allen N. Knowles
Attorney—Young and Quigg

ABSTRACT: A plurality of cylinders are connected to rollers that are in contact with one of two endless conveying belts of a conveying apparatus to control the forces exerted on an article being moved by said apparatus.

INVENTOR.
C. V. BROWN
BY Young & Quigg
ATTORNEYS

PATENTED OCT 5 1971

3,610,500

SHEET 2 OF 2

INVENTOR.
C. V. BROWN

BY Young & Quigg

ATTORNEYS

CONVEYING APPARATUS

This invention relates to improved material handling equipment for handling and conveying extruded tubing and the like away from the extrusion source. In another aspect, this invention relates to apparatus associated with the material handling equipment for controlling the forces exerted on said extruded article being handled.

Apparatus for handling extruded articles, particularly tubular goods, are provided adjacent an extrusion machine for urging the article away from the extrusion machine while supporting said relatively soft and hot article to prevent distortion of the article during cooling.

When using apparatus of this general type, it has heretofore been difficult to control the pressure exerted on the article by the apparatus at values sufficiently high to urge the article from the extruding machine while preventing forces of a magnitude which will distort and damage the article.

It is therefore an object of this invention to provide an improved conveying apparatus. Another object of this invention is to provide an apparatus for a conveying machine for controlling the force exerted on the article being moved by the conveying apparatus. Other aspects, objects, and advantages of the present invention will become apparent from a study of the disclosure, the appended claims, and the drawing.

The drawings are diagrammatic views of the conveying apparatus and the apparatus of this invention.

Figure 2:
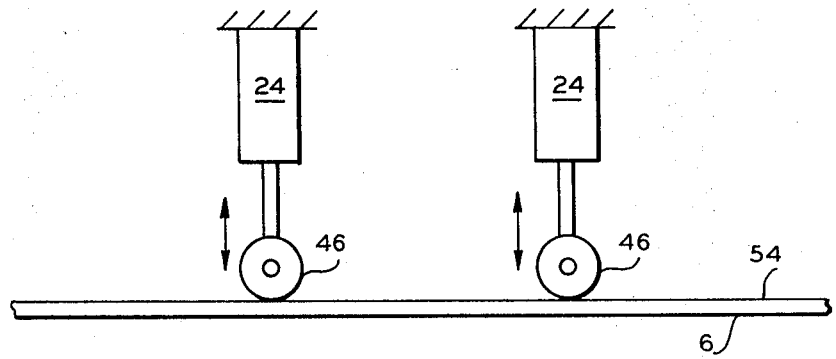
Figure 3:
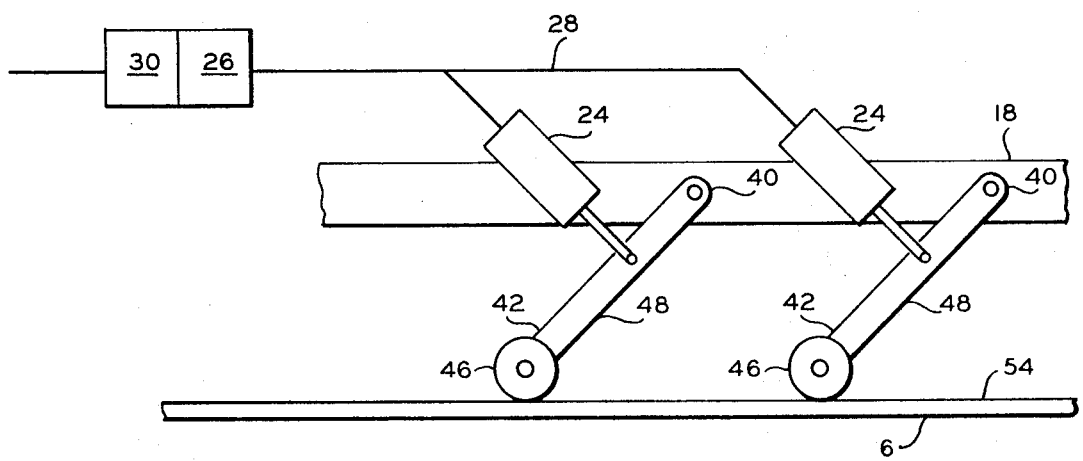

FIG. 1 is a frontal view of a conveying machine with the apparatus of this invention installed thereon, FIG. 2 is a frontal view of one embodiment of the apparatus of this invention, and FIG. 3 is a frontal view of another embodiment of the apparatus of this invention.

With reference to FIG. 1 of the drawings, it will be seen that the elements of the conveying apparatus comprise, in combination, upper and lower elongated endless deck conveyor means shown generally by numerals 2 and 4, respectively, said conveyor means including flexible belts 6 and 8 trained about rearward and forward rotatable drums 10, 12 and 14, 16, respectively, said upper and lower conveyor means being disposed in spaced, superposed, substantially parallel relation.

Elongated supporting structures designated generally by numerals 18 and 20 are positioned longitudinally as shown with respect to said upper and lower conveyor means, said rotatable drums being journaled upon shafts 22, said shafts being rotatably supported by said elongated supporting structures 18 and 20. Said supporting structures are offset with respect to the lateral edges of said flexible belts 6 and 8 and are spaced therefrom, said support structures being further aligned with the horizontal axis of said respective conveyor means. Upper elongated support structure 18 comprises vertically oriented spaced sideplates being connected by end plates to form a rearward section designated generally by numeral 34. A forward section designated generally by numeral 36 comprises vertically oriented spaced sideplates, end plates providing support at one end, the other end of said forward section being bifurcated to straddle the sideplates of said rearward section 34 and is pivotally related therewith by pin 44 extending through said plates of said sections, the pivotal action thus accomplished being in the vertical plane.

Said lower elongated supporting structure 20 is formed of a unitary single section comprised of sideplates and end plates, the pivotal feature of the upper structure being absent therefrom.

A series of horizontally aligned rotatable rollers 46 are arranged above, disposed transversely of, and engage the lower horizontal run 54 of the belt 6 of the upper conveyor means. The rollers are in pressing relation with said run 54 and movable relative to the run by a plurality of cylinders 24 each associated with a separate rotatable roller 46 for urging the rollers and the belt 6 of the upper conveyor means toward the lower conveyor means. A controlling means 26, better seen in FIG. 3, is connected to the cylinders 24 for regulating the downwardly directed force exerted by the rollers 46 on the belt 6. In order to provide more uniform control of the forces exerted on the tubing or article being conveyed, it is preferred that a separate cylinder 24 be connected to each rotatable roller 46. In order to construct an apparatus that is easily controlled, it is preferred that the cylinders 24 be air cylinders, a single air line 28 be connected in fluid communication with the cylinders, an air line 30 be connected to an air source to deliver air pressure to controlling means 26 for controlling the movement of air through the line 28. The controlling means 26 can be any various controlling devices known in the art such as, for example, a throttling valve, an air pressure regulator, etc.

FIG. 2 shows another embodiment of the apparatus of this invention wherein the cylinders are rigidly fixed at one end an rotatably attached to the other end to a roller 46.

FIG. 3 shows an enlarged view of the embodiment of the apparatus shown in FIG. 1 wherein a plurality of crank arms 48 are each pivotally connected at a first end portion 40 to the upper support section 18, rotatably connected at a second end portion 42 to a separate one of the rotatable rollers 46 and pivotally connected to a separate cylinder 24 at a location on the crank arm 48 spaced between the first and second end portions 40, 42.

Accordingly, it will be understood that the rollers impart forces and resilience to said conveyor means 2, thus affording certainty of grip with respect to the material passing therebeneath and are constructed so that a fine adjustment can be made on the forces imparted to the extrudate thereby improving the uniformity and quality if the extrudate by avoiding deformation caused by the conveyor.

To the end of providing resilient support to upper horizontal run 56 of belt 8, backing plate 58 is positioned therebeneath and in slidable engagement therewith, said backing plate being perpendicular with respect to said lower support structure and supported by horizontally disposed bracket arms 60 and vertical columns 62, said bracket arms being integral with said lower support structure and normally disposed with respect thereto, said vertical columns 62 being vertically slidable within in transverse members 64 which are integrally related with respect to said backing plate 58. Compression springs 66 provided peripherally of columns 62, and slidably related therewith, are biased against stationary horizontal bracket arms 60 and transverse members 64, to thereby urge said backing to provide toward engaging relation with run 56 to thus resiliently support said belt 8 as said belt 8 moves thereover during the operation of the apparatus.

Vertical shaft members 68 and 70, mounted upon base support members 72, are slidably and coaxially disposed within guide sleeves 74, said guide sleeves being integrally disposed between the sideplates of said upper and lower elongated support structures.

To enable regulation of the height of said conveyor means with respect to said base support member to permit adjustment of the mutually spaced relation of said conveyor means, adjusting means comprised of vertically disposed threaded support members 76, 78 and 80, 82 are provided, said supporting means being threadably received within internally threaded sleeve nuts 84, said sleeve nuts being provided integrally and transversely of said upper and lower support structures and vertically aligned in pairs centrally of the spaced sideplates of said support structures. Adjusting wheels 86 and 88, coaxially connected at the ends of threaded support members 76 and 80, respectively, when manually rotated, will through chain linkages 90 and 92, cause threaded support members 78 and 82 to be rotated concurrently therewith and in the angular directions thereof. Support members 76, 78, 80 and 82, being precluded against vertical movement by reasons of base support member 72 upon which support member 76 and 78 rest and through which support members 80 and 82 are rotatably held by collars 94, will occasion the upward and downward movement of said upper and lower support structures as said support members are revolved within said sleeve nuts 84. An electric motor (not shown) is mounted upon a frame of the conveyor apparatus and constitutes the driving means provided to drive the upper and lower endless deck conveyor means 2 and 4, Chain 154 links said motor and said rotatable drum 14 in drawing relation, chain 156 extending from the rotatable drum 10 being further effective in rotating the latter, to cause movement of upper and lower flexible belts 6 and 8 in the directions of the arrows 158 and 160.

Other modifications and alterations of this invention will become apparent to those skilled in the art from the foregoing discussion and accompanying drawing, and it should be understood that this invention is not to be unduly limited thereto.

What is claimed is:

1. In an apparatus for facilitating the handling and conveying of extrusion products away from the extruder source having, in combination, upper and lower elongated endless deck conveyor means, respectively, trained about rearward and forward rotatable drums, said upper and lower conveyor means being disposed in spaced, superposed, substantially parallel relation, and upper and lower elongated supporting structure positioned longitudinally of said upper and lower conveyor means, respectively, said rotatable drums being journaled at the rearward and forward ends of said elongated support structures, said upper support structures being formed of rearward and forward sections, said sections being pivotally connected, a series of horizontally aligned rotatable rollers engaging a horizontal run of one of the conveyor means, and driving means associated with at least one of said rotatable drums, the improvement comprising:

a plurality of cylinders each associated with a separate rotatable roller and being movable relative to the run of one of the conveyor means for urging the rollers and the associated conveying means toward the lower conveyor means; and controlling means connected to the cylinders for regulating the downwardly directed force exerted by the rollers on associated conveyor means.

2. An apparatus, as set forth in claim 1, wherein a separate cylinder is connected to each rotatable roller.

3. An apparatus, as set forth in claim 1, wherein a separate air cylinder is connected to each rotatable roller;

a single air line is connected in fluid communication with the plurality of cylinders; and the controlling means is associated with the line for controlling the movement of fluid through the air line.

4. An apparatus, as set forth in claim 1, including a plurality of crank arms each being pivotally connected at a first end portion to the upper support section, rotatably connected at a second end portion to a separate one of the rotatable rollers, and pivotally connected to a separate cylinder at a location on the crank arm between the first and second end portions.

20225 FLH

UNITED STATES PATENT OFFICE

CERTIFICATE OF CORRECTION

Patent No. 3,610,500
Dated Oct. 5, 1971

Claude V. Brown

It is certified that error appears in the above-identified patent and that said Letters Patent are hereby corrected as shown below:

Column 4, line 25, after "arm" should be inserted — spaced —.

Signed and sealed this 11th day of April 1972.

(SEAL)
Attest:

EDWARD M. FLETCHER, JR.
Attesting Officer

ROBERT GOTTSCHALK
Commissioner of Patents